US011280656B2

(12) United States Patent
Gnutti et al.

(10) Patent No.: US 11,280,656 B2
(45) Date of Patent: Mar. 22, 2022

(54) VALVE UNIT FOR A DOSING DEVICE OF A FLUID

(71) Applicant: CAMOZZI AUTOMATION S.P.A., Brescia (IT)

(72) Inventors: Gianluca Gnutti, Brescia (IT); Alberto Drera, Brescia (IT)

(73) Assignee: CAMOZZI AUTOMATION S.P.A., Brescia (IT)

( * ) Notice: Subject to any disclaimer, the term of this patent is extended or adjusted under 35 U.S.C. 154(b) by 0 days.

(21) Appl. No.: 17/254,387

(22) PCT Filed: Jul. 22, 2019

(86) PCT No.: PCT/IB2019/056241
§ 371 (c)(1),
(2) Date: Dec. 21, 2020

(87) PCT Pub. No.: WO2020/026067
PCT Pub. Date: Feb. 6, 2020

(65) Prior Publication Data
US 2021/0270656 A1    Sep. 2, 2021

(30) Foreign Application Priority Data

Aug. 1, 2018 (IT) .......................... 102018000007735

(51) Int. Cl.
*G01F 11/22*    (2006.01)
*F16K 5/06*    (2006.01)
(Continued)

(52) U.S. Cl.
CPC ............ *G01F 11/22* (2013.01); *F16K 5/0605* (2013.01); *G01F 11/021* (2013.01); *G01F 15/005* (2013.01)

(58) Field of Classification Search
CPC ...... G01F 11/22; G01F 11/021; G01F 15/005; F16K 5/0605
See application file for complete search history.

(56) References Cited

U.S. PATENT DOCUMENTS 4,371,146 A * 2/1983 Mese .................... F16K 5/0605
                                                        137/614.17
5,113,895 A    5/1992 Le Devehat
(Continued)

FOREIGN PATENT DOCUMENTS

EP    0646776 A1    4/1995
EP    0825422 A1    2/1998

OTHER PUBLICATIONS

International Search Report, issued in PCT/IB2019/056241, dated Sep. 12, 2019, Rijswijk, Netherlands.

*Primary Examiner* — Michael R Reid
(74) *Attorney, Agent, or Firm* — Arent Fox LLP; Michael Fainberg

(57) ABSTRACT

A valve unit for a dosing device of a fluid has a unit body having a fluid inlet passage, a fluid outlet passage, and, therebetween, an obturator seat housing a ball obturator. An obturator passage is formed in the ball obturator, which is rotatable between an open position, in which the obturator passage fluidically connects the fluid inlet passage to the fluid outlet passage, and a closed position, in which the ball obturator prevents passage of fluid from the fluid inlet passage to the fluid outlet passage. A fluid-tight intake piston, slidingly housed in a piston chamber and integral in rotation with the ball obturator, fluidically communicates with the fluid inlet and outlet passages. Cam means arranged between the unit body and the fluid-tight intake piston cause translation of the fluid-tight intake piston from an advanced
(Continued)

position to a retracted position for intaking residual fluid present in the obturator passage.

10 Claims, 5 Drawing Sheets

(51) Int. Cl.
    *G01F 11/02*     (2006.01)
    *G01F 15/00*     (2006.01)

(56) References Cited

U.S. PATENT DOCUMENTS

| | | | | |
|---|---|---|---|---|
| 5,586,579 | A * | 12/1996 | Diehl | F16K 5/0605 |
| | | | | 137/493.8 |
| 6,814,101 | B2 * | 11/2004 | Flauzac | F16K 5/0605 |
| | | | | 137/517 |
| 10,502,333 | B2 * | 12/2019 | Rizzio | B01D 35/04 |
| 10,900,208 | B2 * | 1/2021 | Tanghetti | E03C 1/084 |

* cited by examiner

VALVE UNIT FOR A DOSING DEVICE OF A FLUID

CROSS-REFERENCE TO RELATED APPLICATIONS

This application is a National Phase Application of PCT International Application No. PCT/IB2019/056241, having an International Filing Date of Jul. 22, 2019 which claims priority to Italian Application No. 102018000007735 filed Aug. 1, 2018, each of which is hereby incorporated by reference in its entirety.

FIELD OF THE INVENTION

The present invention relates to a valve unit for a dosing device of a fluid, e.g. a paint.

BACKGROUND OF THE INVENTION

Fluid dosing devices, e.g. a paint, are already known. In some embodiments, these devices comprise a pump group which draws fluid from a tank and dispenses it through a valve unit that controls the fluid dosing.

In some embodiments, the valve unit comprises a unit body in which are formed a fluid inlet passage, a fluid outlet passage and, between said fluid inlet passage and fluid outlet passage, an obturator seat in which a ball shutter obturator is housed.

In some embodiments, the valve unit comprises, according to the preamble of claim 1, a unit body in which there are formed a fluid inlet passage, a fluid outlet passage and, between said inlet passage and outlet passage, an obturator seat in which a ball shutter obturator is housed.

In the ball obturator, an obturator passage is formed and the ball obturator is rotatable between an open position, wherein the obturator passage fluidically connects the inlet passage with the outlet passage, and a closed position, wherein the ball obturator prevents the passage of fluid from the inlet passage to the outlet passage.

Typically, when the ball obturator is in the closed position, the obturator passage connects the inlet passage with a recirculation conduit, so as to allow a recirculation of the fluid present in the dosing device, preventing, after the supply interruption, any residual fluid from drying inside the device, damaging it or otherwise blocking the passages.

One of the problems encountered in this type of device, in particular when the fluid to be dosed has a certain viscosity, such as paints, lies in the fact that, at the end of the dispensing of the fluid and in the passage from the open position to the closed position of the ball obturator, a drop is formed on the outlet end of the obturator passage which, over time, can damage the sealing element on which the ball obturator slides and which delimits the outlet passage.

SUMMARY OF THE INVENTION

The object of the present invention is to propose a valve unit for a dosing device for a fluid capable of obviating such a drawback.

Said object is achieved by a valve unit as described and claimed herein. Preferred embodiments of the valve unit according to the present invention are also described.

BRIEF DESCRIPTION OF THE DRAWINGS

The features and the advantages of the valve unit according to the invention shall be made readily apparent from the following description of preferred embodiments thereof, provided purely by way of a non-limiting example, with reference to the accompanying figures, in which:

FIG. 1b is a section of the valve unit along the section plane of FIG. 1a;

FIG. 2b is a section of the valve unit along the section plane of FIG. 2a;

FIG. 3b is a section of the valve unit along the section plane of FIG. 3a;

FIG. 4b is a section of the valve unit along the section plane of FIG. 4a; and

DETAILED DESCRIPTION

Figure 1:
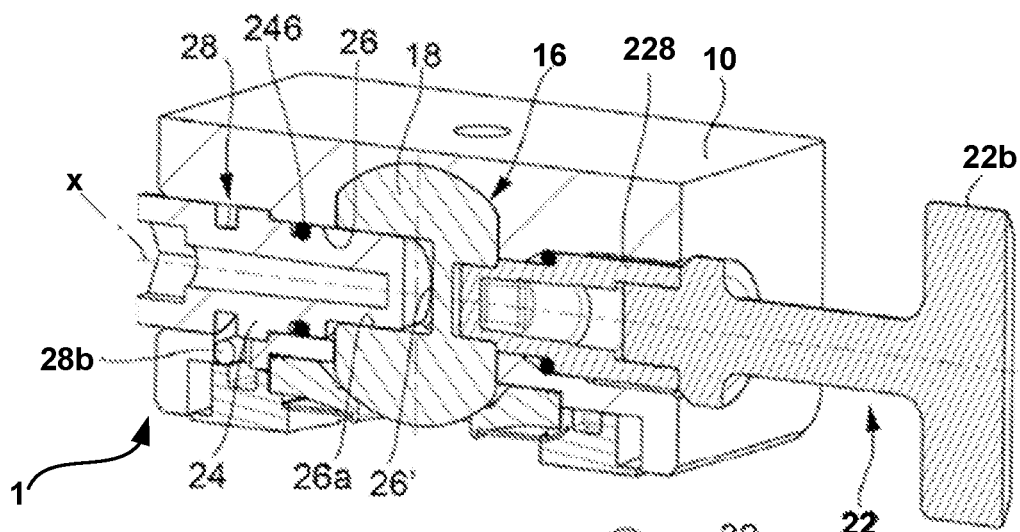
FIG. 1 is a perspective sectional view of the valve unit according to the invention, with the ball obturator in open position.
Figure 1A:
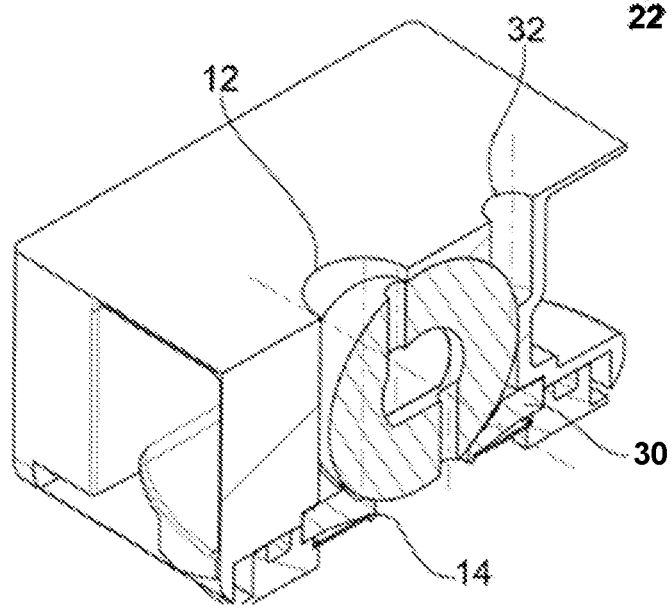
FIG. 1a is a view similar to the previous one, but with the valve unit sectioned along a section plane orthogonal to that of FIG. 1.

In said drawings, reference numeral 1 indicates a valve unit of a dosing device for a fluid according to the invention.

In a general embodiment, the valve unit 1 comprises a unit body 10 wherein are made an inlet passage 12 of the fluid to be dosed, a fluid outlet passage 14, and, between said inlet passage 12 and outlet passage 14, an obturator seat 16.

In the example shown in the figures, the unit body 10 is shown for simplicity as a separate block. In reality, the valve unit 1 can be integrated into the dosing device and therefore the unit body 10 can be a portion of the body of the dosing device. Therefore, also the inlet passage 12 and the recirculation conduit 32, which will be described below, may be terminal segments of respective conduits formed in the body of the dosing device.

A ball obturator 18 is sealingly housed in the obturator seat 16.

The term "ball obturator" should not be understood in a limiting manner as referring to a perfectly spherical obturator, but it also includes axially symmetrical obturator shapes having at least one spherical surface portion that facilitates the seal of the obturator in its seat.

In other embodiments, the obturator could also have a cylindrical-shaped surface.

An obturator passage 20 is formed in the ball obturator 18. The ball obturator 18 is rotatable between an open position (FIGS. 1-1b), in which the obturator passage 20 fluidically connects the inlet passage 12 with the outlet passage 14, and a closed position (FIGS. 4-4b), in which the ball obturator 18 prevents the passage of fluid from the inlet passage 12 to the outlet passage 14.

The ball obturator 18 can be rotated by means of control means 22 of the rotation of the ball obturator.

According to an aspect of the invention, the valve unit 1 is provided with an intake piston 24.

The intake piston 24 is slidably and fluid-tightly housed in a piston chamber 26. The piston chamber 26 is in fluid communication with the obturator passage 20.

Moreover, the intake piston 24 interacts with the unit body 10 through cam means 28.

These cam means 28 are suitable to cause, following the rotation of the ball obturator 18 from the open position to the closed position, a translation of the intake piston 24 in the piston chamber 26 from an advanced position to a retracted position for an intake of the residual fluid present in the obturator passage 20.

In particular, in the case of formation of a drop of fluid on the distal end 20' of the obturator passage 20 open towards the outlet passage 14, the retraction of the obturator piston 24 causes a suction effect in the obturator passage 20 which causes the suction of the drop from the end 20' of the obturator passage inside the obturator passage 20 itself.

Therefore, when the rotation of the ball obturator 18 towards the closed position is completed and the distal end 20' of the obturator passage 20 is capped by the wall which delimits the obturator seat 16, there is no fluid residue on the end distal 20' which could damage the sealing element 30 on which the ball obturator 18 slides and which delimits the outlet passage 14. The intake step is completed before the distal end 20' of the obturator passage 20 comes into contact with the sealing element 30.

In one embodiment, a recirculation conduit 32 is also formed in the unit body 10. As explained above, the recirculation conduit 32 is used to allow the recirculation of the fluid which is in the inlet passage 12 and/or in the obturator passage 20 when the ball obturator 18 is in the closed position and the fluid ceases to be dispensed from the outlet passage 14.

For example, the inlet passage 12 and the recirculation conduit 32 are parallel to each other.

The obturator passage 20 is therefore in fluid communication with the recirculation conduit 32 when the ball obturator 18 is in the closed position.

In one embodiment, the cam means 28 are configured so that the intake piston 24 reaches the retracted position when the ball obturator 18 is rotated to an intermediate position between the open position and the closed position. Furthermore, the intake piston 24 returns to the forward position when the ball obturator 18 reaches the closed position.

In this way, in the return step to the advanced position, the intake piston 24 acts as a compressor to expel the drop of fluid previously sucked into the recirculation conduit 32.

In one embodiment, the open position and the closed position are spaced apart by an angle of about 90°.

Moreover, the inlet and 12 outlet passages 14 and the obturator passage 20 are made in such a way that the ball obturator 18 is rotatable unidirectionally to be returned to the open position and returns to the open position at each 180° rotation.

More in detail, the obturator passage 20 comprises a first radial channel 20a, a second radial channel 20b, parallel to the first, and a central chamber 20c.

The central chamber 20c is formed by an end section of the piston chamber 26.

The first and second radial channel 20a, 20b are substantially tangent, in diametrically opposite positions, to the central chamber 20c.

In other words, the radial channels 20a and 20b are not aligned with each other but extend along respective parallel and spaced channel axes.

Figure 1B:
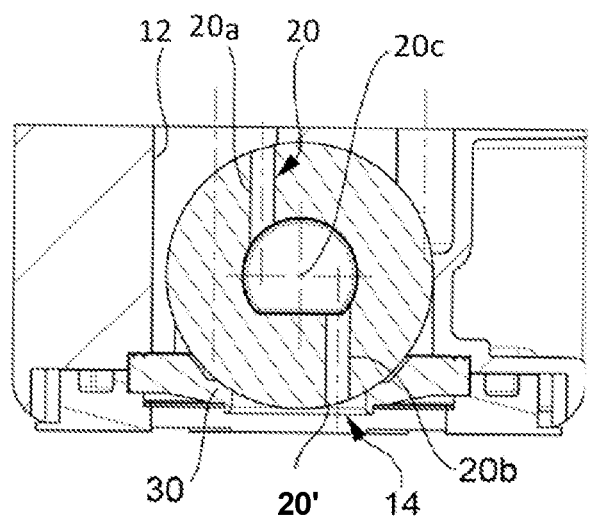
Figure 2:
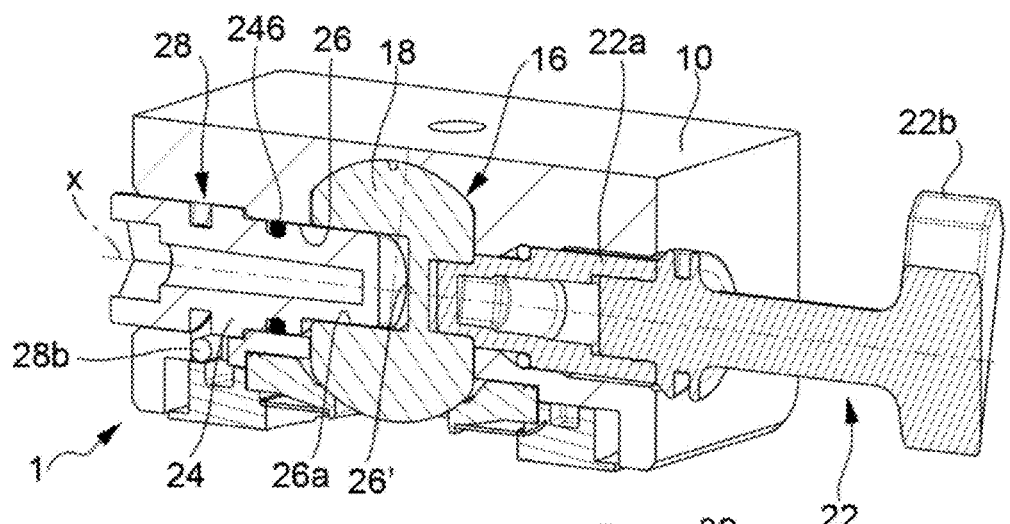
FIG. 2 is a perspective sectional view of the valve unit according to the invention, at the time of the beginning of the intake step.
Figure 2A:
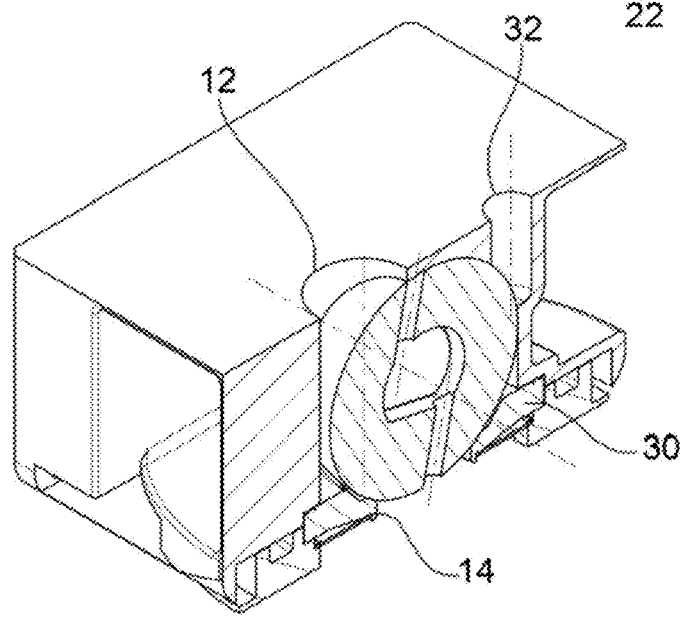
FIG. 2a is a view similar to the previous one, but with the valve unit sectioned along a section plane orthogonal to that of FIG. 2.
Figure 2B:
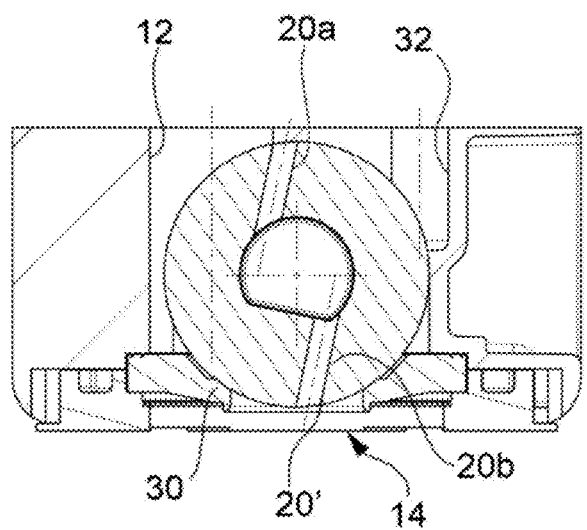

In particular, as can be seen from FIGS. 1b and 2b, when the ball obturator 18 is in the open position, the second radial channel 20b, despite being open on the outlet passage 14, is at the maximum possible distance from the point of the obturator seat 16, and in particular of the sealing element 30, towards which it is made to rotate and by which it will be occluded. In this way, the angular stroke of the ball obturator 18 is sufficient to cause the intake piston 24 to retract and therefore an effective drop suction effect.

In one embodiment, the piston chamber 26 extends at least partially in the ball obturator 18. The central chamber 20c is therefore delimited by a bottom wall 26' of the piston chamber 26 and by the end of the intake piston itself.

For example, the intake piston 24 is translatable along a piston axis X orthogonal to an obturator passage plane in which the radial channels 20a, 20b lie.

Figure 5:
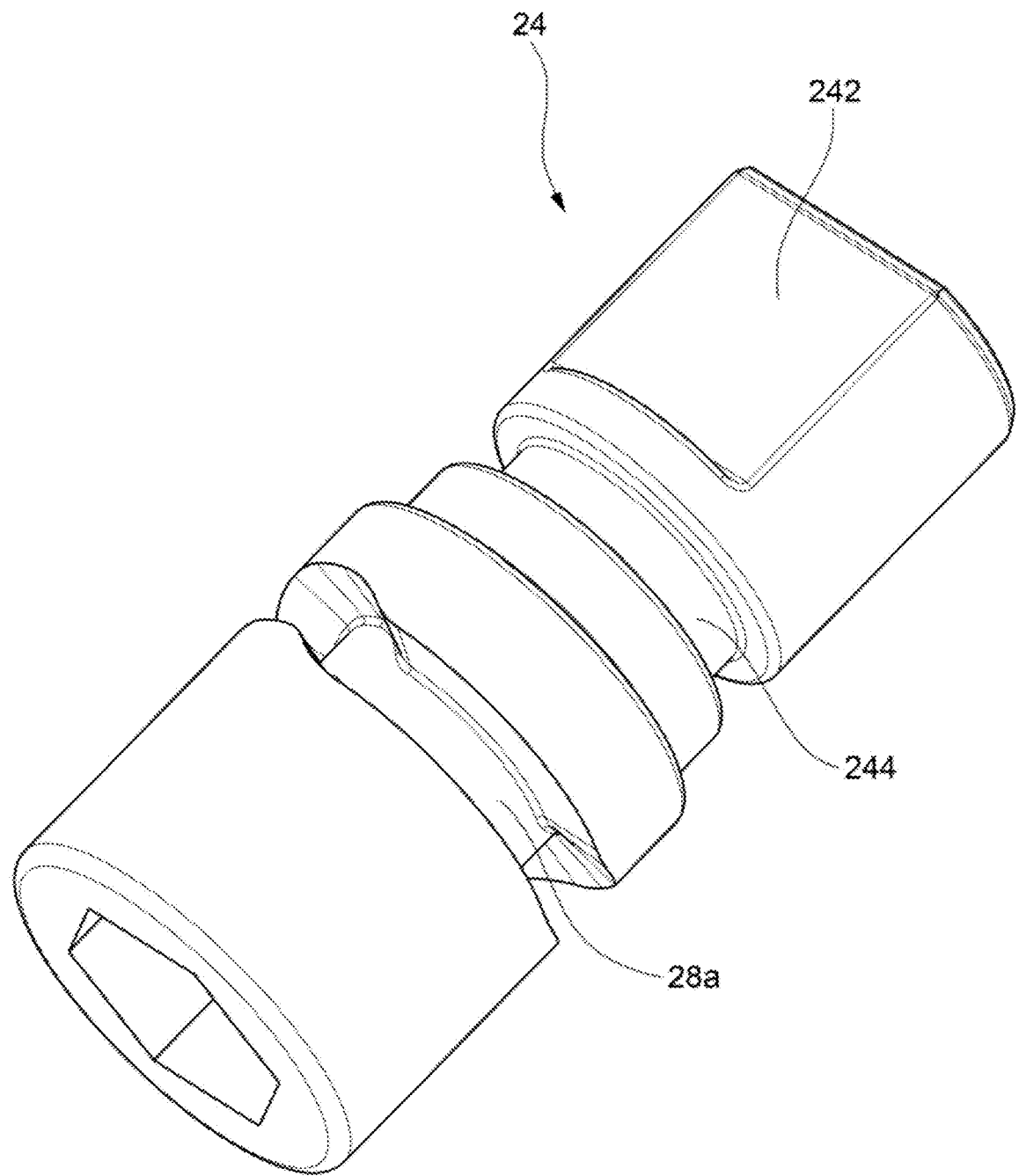
FIG. 5 is a perspective view of the intake piston alone.

In one embodiment, the cam means 28 comprise a circumferential groove 28a formed in the lateral surface of the intake piston 24 (FIG. 5) and configured with a cam profile suitable for realizing the translation movement of the intake piston between the advanced position and the retracted position. The circumferential groove 28a is engaged by a cam pin 28b integral with the unit body 10.

In one embodiment, the intake piston 24 has an end portion 242 inserted with an anti-rotation shape coupling in a corresponding end portion 26a of the piston chamber 26, for example in the portion of the piston chamber 26 formed in the ball obturator 18.

For example, both the end portion 242 of the intake piston 24 and the end portion 26a of the piston chamber 26 have a substantially cylindrical shape with a flattened lateral portion.

In the lateral wall of the intake piston 24 there is also formed an annular seat 244 in which an O-ring is fitted for the sealed sliding of the intake piston in the piston chamber 26.

In one embodiment, the control means 22 comprise a rotation shaft 22a fitted in the ball obturator 18 coaxially, and on the opposite side with respect to the intake piston 24.

The rotation shaft 22a can be driven to rotate by an electric motor, of which only the shaft 22b is shown in the figures.

The operation of the valve unit will now be described, with reference to the example shown in the drawings.

FIGS. 1-1b represent the valve unit 1 in the open configuration. In this configuration, the ball obturator 18 is positioned so that the obturator passage 20 places the inlet passage 12 in fluid communication with the outlet passage 14. In particular, in FIG. 1b it can be seen that the first radial channel 20a opens into the inlet passage 12, but in the vicinity of the wall that delimits this passage in the direction of rotation of the ball obturator 18, which in the example shown rotates in clockwise direction.

On the contrary, the second radial channel 20b is open on the outlet passage 14, but at the maximum distance with respect to the edge which defines the outlet passage 14 in the direction of rotation of the ball obturator 18.

FIGS. 2-2b show the valve unit 1 at the beginning of the intake step. At this moment, the ball obturator 18 has begun its rotation towards the closed position and the intake piston 24, thanks to the cam means 28, has started its stroke towards the retracted position. The suction effect is thus generated in the obturator passage 20. It is noted, in FIG. 2b, that the first radial channel 20a has just been capped by the unit body 10, while the second radial channel 20b is open almost in a central position of the outlet passage 14.

Figure 3:
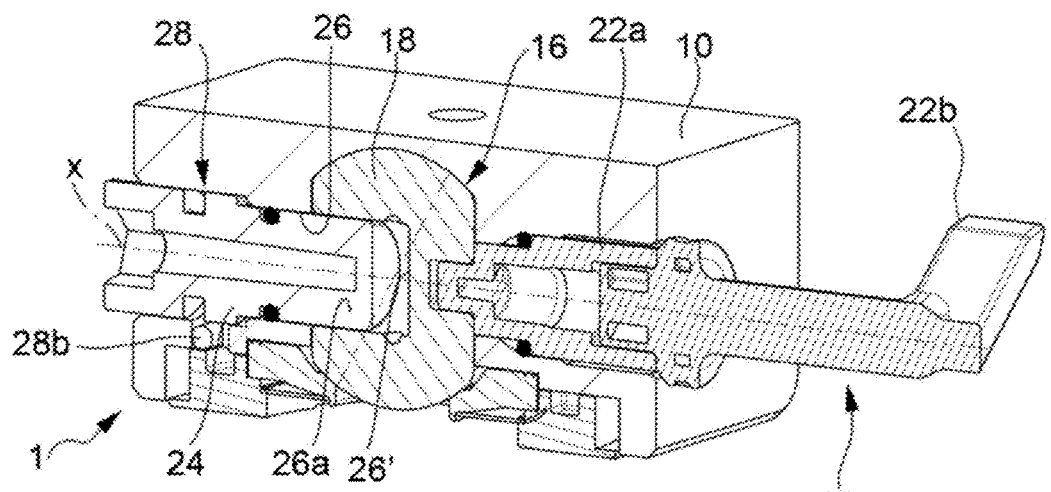
FIG. 3 is a perspective sectional view of the valve unit according to the invention, at the end of the intake step.
Figure 3A:
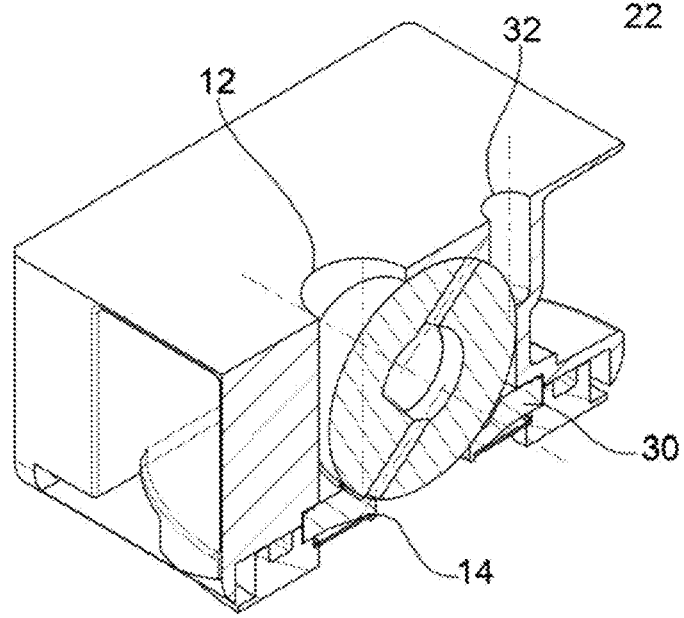
FIG. 3a is a view similar to the previous one, but with the valve unit sectioned along a section plane orthogonal to that of FIG. 3.
Figure 3B:
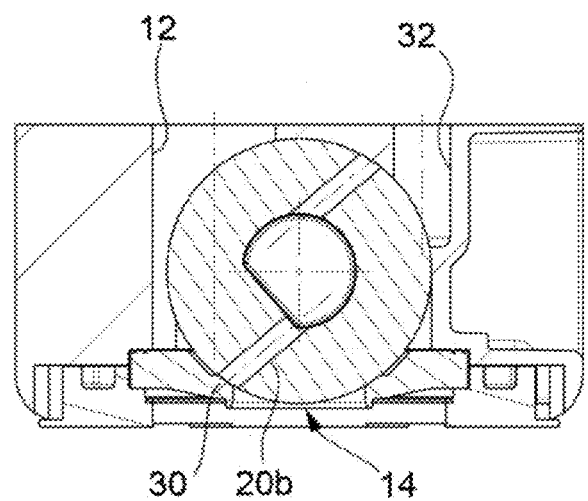

FIGS. 3-3b show the valve unit 1 at the end of the intake step. At this moment, the ball obturator 18 has, with respect to the initial opening position, made a rotation of an angle of about 45°, while the intake piston 24 has reached the retracted position completing the intake. It should be noted, in FIG. 3b, that the first radial channel 20a is still capped by the unit body 10, despite being in proximity to the recirculation conduit 32, while the second radial channel 20b, now devoid of fluid residues since they have been completely aspirated, has just been occluded by the sealing element 30.

Figure 4:
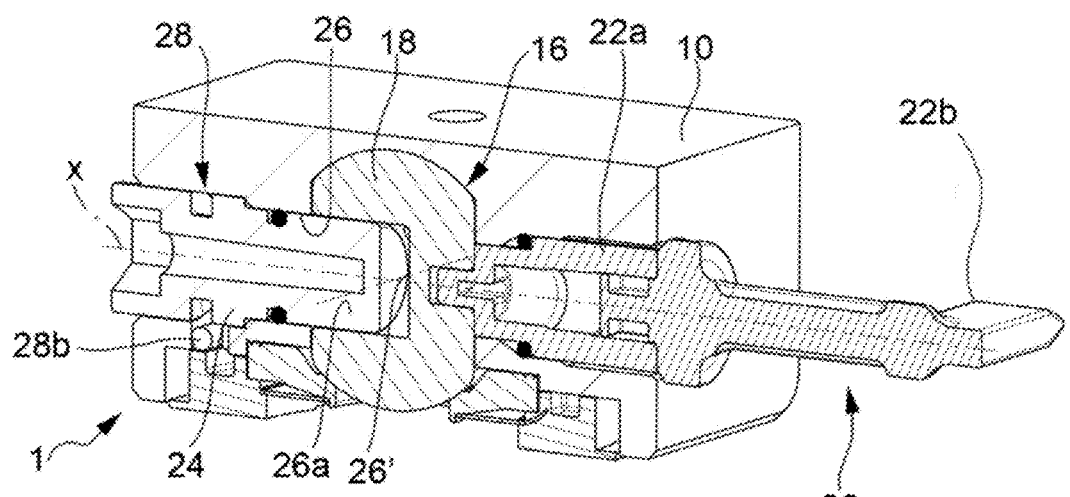
FIG. 4 is a perspective sectional view of the valve unit according to the invention, with the ball obturator in closed position.
Figure 4A:
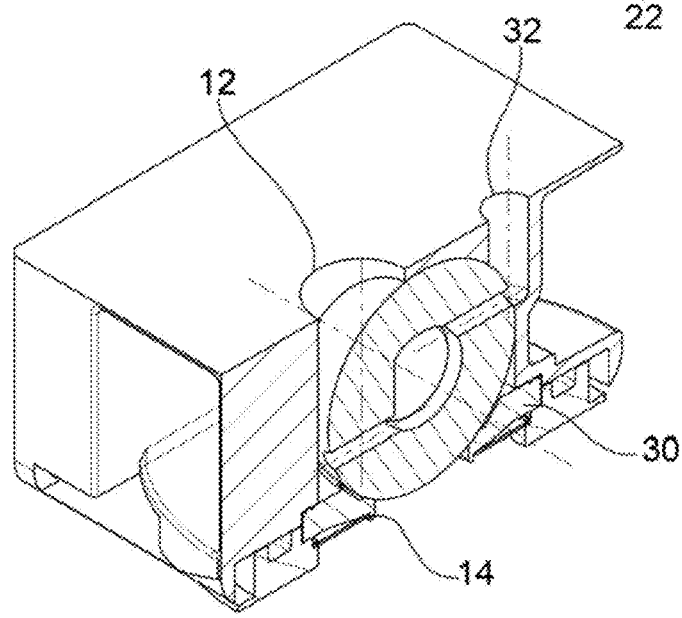
FIG. 4a is a view similar to the previous one, but with the valve unit sectioned along a section plane orthogonal to that of FIG. 4.
Figure 4B:
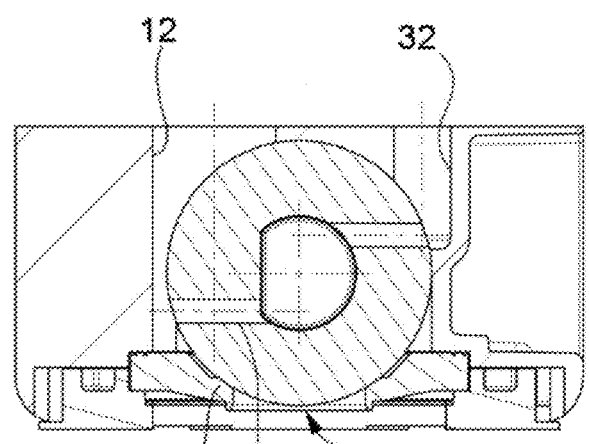

FIGS. 4-4b show the valve unit 1 in the closed position. In this position, the ball obturator 18 has made an angle of 90° with respect to the open position and the intake piston 24 has returned to an advanced position.

The first radial channel 20a is now open in the recirculation conduit 32, while the second radial channel 20b is open on the inlet passage 12. In this way, it is possible to carry out the recirculation of the fluid possibly present in the inlet passage 12 and in the obturator passage 20.

It should be noted that the translation of the intake piston 24 from the retracted position to the advanced position causes a compression effect in the obturator passage, open on the recirculation conduit 32, which helps to expel the drop sucked into the recirculation conduit 32.

In one embodiment, from the closed position the ball obturator 18 can be controlled to rotate by an angle of 90°, still in the same direction, to return to the open valve starting position.

In one embodiment, the cam means are configured such that, in the rotation from the closed position to the initial opening position, the intake piston rotates without moving.

A man skilled in the art may make several changes, adjustments and replacements of elements with other functionally equivalent ones to the embodiments of the valve unit according to the invention in order to meet incidental needs, without departing from the scope of the following claims. Each of the features described as belonging to a possible embodiment can be obtained independently of the other embodiments described.

The invention claimed is:

1. A valve unit for a dosing device of a fluid, including a paint, the valve unit comprising:
   a unit body comprising a fluid inlet passage, a fluid outlet passage, and, between said fluid inlet passage and said fluid outlet passage, an obturator seat;
   a ball obturator housed in the obturator seat, an obturator passage being formed in the ball obturator, the ball obturator being rotatable between an open position, in which the obturator passage fluidically connects the fluid inlet passage to the fluid outlet passage, and a closed position, in which the ball obturator prevents passage of fluid from the fluid inlet passage to the fluid outlet passage;
   control means for controlling rotation of the ball obturator;
   a fluid-tight intake piston slidingly housed in a piston chamber which fluidically communicates with the fluid inlet passage and the fluid outlet passage, the fluid-tight intake piston being integral in rotation with the ball obturator;
   cam means between the unit body and the fluid-tight intake piston suitable for causing, following rotation of the ball obturator from the open position to the closed position, a translation of the fluid-tight intake piston in the piston chamber from an advanced position to a retracted position for intaking residual fluid present in the obturator passage.

2. The valve unit of claim 1, wherein a recirculation conduit is formed in the unit body, the obturator passage being in fluid communication with said recirculation conduit when the ball obturator is in the closed position.

3. The valve unit of claim 2, wherein the cam means are configured so that the fluid-tight intake piston reaches the retracted position when the ball obturator is rotated to an intermediate position between the open position and the closed position and returns to the advanced position when the ball obturator reaches the closed position.

4. The valve unit of claim 1, wherein the open position and the closed position are spaced by an angle of 90°.

5. The valve unit of claim 1, wherein the obturator passage comprises a first radial channel, a second radial channel parallel to the first radial channel, and a central chamber formed on an end section of the piston chamber, the first and the second radial channels being tangent, in diametrically opposite positions, to the central chamber.

6. The valve unit of claim 5, wherein the piston chamber extends at least partially into the ball obturator, the fluid-tight intake piston being translatable along a piston axis orthogonal to an obturator passage plane, the first and second radial channels lying in the obturator passage plane.

7. The valve unit of claim 4, wherein the fluid inlet and outlet passages and the obturator passage are made in such a way that the ball obturator is rotatable unidirectionally to be returned to the open position and returns to the open position at each 180° rotation.

8. The valve unit of claim 1, wherein the cam means comprise a circumferential groove formed in a side surface of the fluid-tight intake piston and configured with a cam profile suitable for achieving translation movement of the fluid-tight intake piston between the advanced position and the retracted position and a cam pin integral with the unit body and engaging the circumferential groove.

9. The valve unit of claim 1, wherein the fluid-tight intake piston has an end portion inserted with an anti-rotation shape coupling in a corresponding end portion of the piston chamber.

10. The valve unit of claim 1, wherein the control means comprise a rotation shaft inserted in the ball obturator coaxially to the fluid-tight intake piston.

* * * * *